United States Patent
Encrenaz et al.

(10) Patent No.: US 11,308,373 B2
(45) Date of Patent: Apr. 19, 2022

(54) MODIFYING COLOR PLANES

(71) Applicant: Hewlett-Packard Development Company, L.P., Spring, TX (US)

(72) Inventors: Michel Georges Encrenaz, Sant Cugat del Valles (ES); Jordi Arnabat Benedicto, Sant Cugat del Valles (ES); Javier Castro Soriano, Sant Cugat del Valles (ES); Alejandro Carderera, Sant Cugat del Valles (ES); Emilio Angulo Navarro, Sant Cugat del Valles (ES); Marcos Casaldaliga Albisu, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/261,188

(22) PCT Filed: Oct. 2, 2018

(86) PCT No.: PCT/US2018/053991
§ 371 (c)(1),
(2) Date: Jan. 19, 2021

(87) PCT Pub. No.: WO2020/072042
PCT Pub. Date: Apr. 9, 2020

(65) Prior Publication Data
US 2021/0287062 A1   Sep. 16, 2021

(51) Int. Cl.
*G06K 15/02* (2006.01)

(52) U.S. Cl.
CPC .................. *G06K 15/1878* (2013.01)

(58) Field of Classification Search
CPC .................................... G06K 15/1878
See application file for complete search history.

(56) References Cited

U.S. PATENT DOCUMENTS

| | | | |
|---|---|---|---|
| 5,581,667 A | 12/1996 | Bloomberg | |
| 6,549,303 B1 | 4/2003 | Trask | |
| 6,919,973 B1 | 7/2005 | Meyer et al. | |
| 7,227,669 B2 | 6/2007 | Loce et al. | |
| 7,532,767 B2 | 5/2009 | Oztan et al. | |
| 7,688,473 B2 | 3/2010 | Purdum et al. | |
| 7,742,652 B2* | 6/2010 | Oh ..................... | G06T 5/002 358/3.26 |
| 7,830,543 B2* | 11/2010 | Maki ................... | H04N 1/2158 358/1.18 |
| 8,199,359 B2 | 6/2012 | Gandhi et al. | |
| 9,147,232 B1 | 9/2015 | Kuo et al. | |
| 2004/0085557 A1 | 5/2004 | Loce et al. | |
| 2006/0087694 A1 | 4/2006 | Purdum et al. | |
| 2009/0154807 A1 | 6/2009 | Rossato et al. | |
| 2010/0171970 A1 | 7/2010 | Takayama et al. | |

\* cited by examiner

*Primary Examiner* — Quang N Vo
(74) *Attorney, Agent, or Firm* — HP Inc. Patent Department (57) ABSTRACT

In examples, a method includes receiving print image data representing an image to be printed and selectively modifying at least one of an initial background print agent color plane and an initial image print agent color plane to determine a modified color plane.

20 Claims, 8 Drawing Sheets

MODIFYING COLOR PLANES

BACKGROUND

When printing print agent such as an ink, toner or the like onto a substrate to form an image, in some circumstances a background layer of print agent is applied above or below the print agent used to form an image.

BRIEF DESCRIPTION OF DRAWINGS

Examples will now be described with reference to the accompanying drawings, in which.

DETAILED DESCRIPTION

Figure 1:
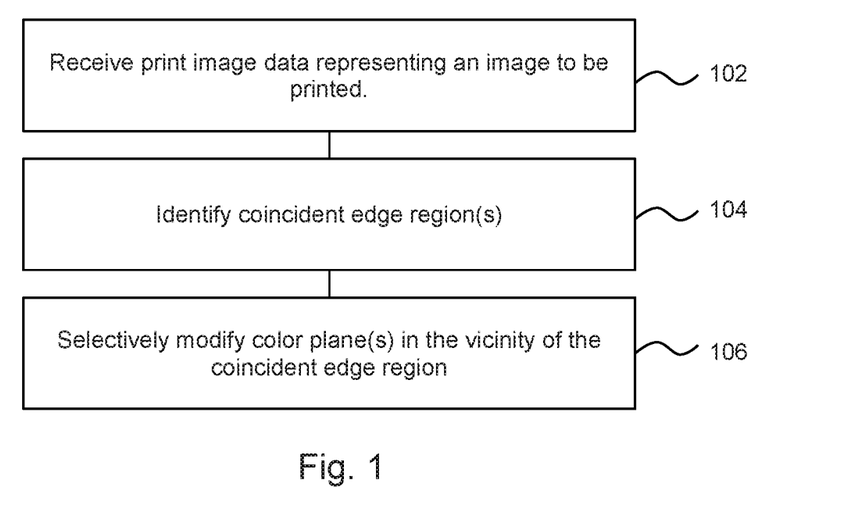
FIG. 1 is a flow chart showing an example method of modifying a print agent color plane.

FIG. 1 shows an example method, which may for example be implemented by at least one processor or other computing device. The method is a method of modifying a print agent color plane comprising, in block 102, receiving print image data representing an image to be printed.

The print image data may, for example, be indicative of an image, text, a pattern or the like. In some examples, the print data may comprise data specifying location(s) on a substrate in which print agent should be printed to the substrate in order to form the image. The print image data may be in the form of at least one grid of values corresponding to colors of the pixels in the image. In some examples, the print data may be in the form of a set of position vectors that specify the coordinates of each region and color vectors that specify the colors of each region. In some examples, the color vectors may be Red-Green-Blue (RGB) vectors. The data may be received over a network, or from a local memory or the like.

In some examples, the print image data may be provided as a set of color planes. In other examples, color planes may be derived from received print image data. For example, in printing, it may be that a set of colored print agents comprising cyan, magenta, yellow and black (CMYK) is provided. A color plane (which may sometimes be referred to as a 'separation') relating to each of these print agents may be defined such that, when overlaid, an intended image may be formed. This image may comprise cyan, magenta, yellow and black portions but also colors resulting from a mixture of these print agent colors (with the mixture in some examples being a human-perceived mixture of separate dots of print agent).

In some examples, a background print agent plane may be provided or derived. In some examples, a background print agent is to be applied above or below an image on the substrate. For example, when printing a colored image on a non-white, or non-uniform, substrate, a layer of white background print agent may be applied to the substrate before the colored image is printed over the top. In this way, the white background lies below the colored image and provides an even tone to the finished printed product, and may, for example, prevent image regions from appearing 'grey' (or some other color) in regions where the color of the substrate shows through. In another example, a colored image may be printed on a transparent substrate (a 'transparency') and a background layer of print agent may be applied over the top of the colored image. In this way, the background print agent provides a more uniform background opacity when the image is viewed through the transparency. In other examples, the image may be under-printed with a background print agent on a transparency, for example when it is to be viewed from the printed side.

In some examples, an under-print mode of printing is used whereby a layer of background print agent is formed on the substrate followed by layer(s) of image print agent to form the image. In other examples, an over-print mode of printing is contemplated whereby the image print agent is first applied to the substrate followed by a layer of background print agent. In some examples, the background print agent is applied as a 'sandwich' layer between image layers (for example to provide images which are visible on both sides of a transparency).

While in some examples, such background print agent color planes may be provided as the print image data, in other examples, a color plane may be derived therefrom. In one example, a white background plane may be defined along with other color planes. For example, an image may be defined with CMYK+W (white) color planes, whether by a designer or automatically, for example during a Raster Image Processing (RIP) stage of preparing an image for printing. In other examples, a white plane may be added to other previously determined color planes. In some examples, the colors of the image which comprise the color of the background print agent (for example, a portion of the image may be white, and the background print agent may also be white) may be added to or included in the background print agent color plane.

Block 104 comprises identifying, by a processor and from the print image data, at least one coincident edge region in an initial background print agent color plane and an initial image print agent color plane. The initial background print agent color plane specifies an intended placement of background print agent. The initial image print agent color plane specifies an intended placement of an image print agent.

In some examples, the background print agent may be a white print agent whereas the image print agents may comprise, for example cyan, magenta, yellow and black print agents. Other image print agent sets may include, for example, in addition to the CMYK print agents, an orange and green print agent, light versions of cyan, magenta, yellow and/or black, sets including a 'spot color' which may for example be specific to an intended use, or any other set of print agents.

The coincident edge region is an edge of an area to be printed with both background print agent and the image print agent. The edge may be an edge of an area to be printed with print agent in at least the background image color plane and may be an edge of an area to be printed with print agent in the background print agent color plane which coincides with an edge of an area to be printed with print agent in in the image print agent color plane. In other words, the edge is an edge of an area in (at least) the background color plane which is intended to receive print agent in both a background print agent color plane and an image print agent color plane (i.e., an area of overlapping print agent application areas in both color planes) This may therefore be compared to a coincident edge which is formed between two separate specified regions of color which abut (but do not overlie) one another. In some examples, coincident edge identification may be carried out for all image color planes, for example to identify coincident edges between a background print image color plane and any specified image print agent color plane.

Block 106 comprises selectively modifying at least one of the initial background print agent color plane and the initial image print color plane in the vicinity of the identified coincident edge region to determine a modified color plane. The modification may be selective in that it occurs in the of the identified coincident edge region, and not in image areas which are not in the vicinity of coincident edge regions. For example, as is set out in greater detail below, this may comprise eroding a region along an identified coincident edge in a background print agent color plane which is intended to receive background print agent, and/or may comprise dilating a region along an identified coincident edge in an image print agent color plane which is intended to receive image print agent. In some examples, the modification may be selective in that additional criteria are applied, as set out in greater detail below.

In some examples, a coverage level (i.e. depth or amount of background print agent) may be chosen in view of the color density of the background or in view of the quality of the colors in the image. For example, the vividness or quality of the image colors may be improved by over- or under-printing on a background color. This may result in a relatively high coverage level. In some examples, the coverage level of the background may exceed the coverage level in any given image color plane. This can in turn mean that the background print agent is more likely to 'bleed' from a location at which it is placed to a nearby location. In other words, the background print agent may be more prone to spreading beyond intended borders than an image print agent. Where background print agent is applied to improve the resulting image quality in regions which are intended to underlie image portions exactly (i.e., where there is a 'coincident edge' as defined above), this can result in an unintended 'halo' effect where the background print agent is visible around the edge of the image print agent.

The method of FIG. 1 may therefore carry out a selective modification to compensate for bleed in the background print agent in some examples. Bleed may be associated with background print agent (for example, some white print agents may be intrinsically more prone to spreading than other print agents) or may be associated with higher coverage levels.

In some examples, the method may further comprise applying print agent to a substrate (i.e. printing an image) based on the modified background print agent color plane and/or image print color plane. In some examples, the substrate is a fibrous sheet-like material such as paper, fabric or a synthetic material such as a plastic sheet, which may be a transparency. In some examples, the substrate may be colored or off-white. In some examples, the substrate may be textured, the texture causing the substrate to appear to have fine grain color variations. While such substrates may, in particular, benefit from a background print agent, in principle, the substrate could be any color or type.

Figure 2A:
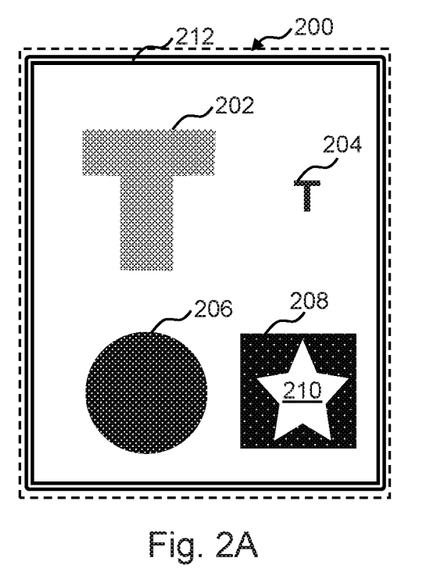
FIG. 2A is an example of an image.

FIG. 2A shows an example of an image 200 to be printed. In this simple example, a large red T shape 202, a small cyan T shape 204, a yellow circle 206 and a magenta frame 208 are to be printed using a CMYK print agent set on a black substrate, for example a black vinyl. The large red T shape 202 is to be printed with an equal combination of magenta and yellow print agent. The cyan T shape 204 and yellow circle 206 are to be produced by cyan and yellow print agents respectively. The magenta frame 208 is to be printed with magenta print agent and frames a star shape 210. The star shape 210 is to be left clear of print agent, so that the underlying black vinyl substrate can be seen. A white border 212 is also to be printed in background print agent. Such a border 212 may comprise part of image data, but in this example is automatically added to provide an indication of an intended image size, for example to provide cutting marks. The image size may, in some examples, be specified in image data and the border may be derived therefrom. In this example, each of the colored features is to be under-printed with white background print agent. This may for example be specified in print image data, may be a global setting for a particular substrate, may be user specified, or may be specified in some other way. In one example, a user may provide, specify or select a background image plane when configuring a print job.

Figure 2B:
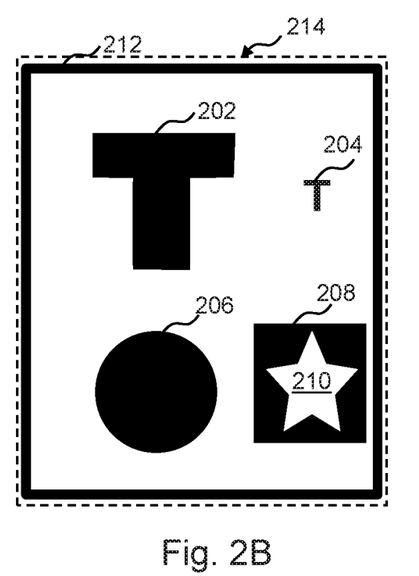
FIGS. 2B-E are examples of color planes of the image of FIG. 2A.

FIG. 2B shows the background print agent color plane 214 (with solid black indicating the intended placement of print agent), to be printed with white print agent. In this example, both T shapes 202, 204, the circle 206, the frame 208 and the border 212 can be seen in the background print agent color plane 214.

Figure 2C:
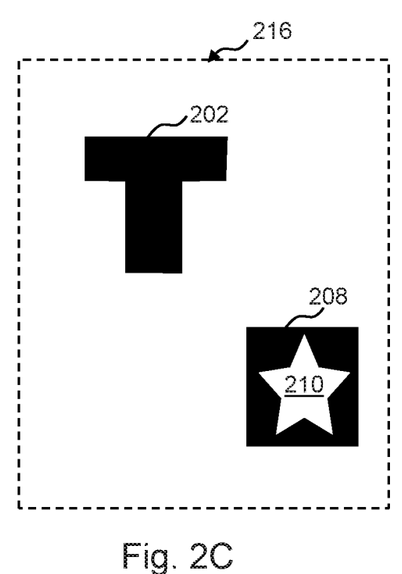
Figure 2D:
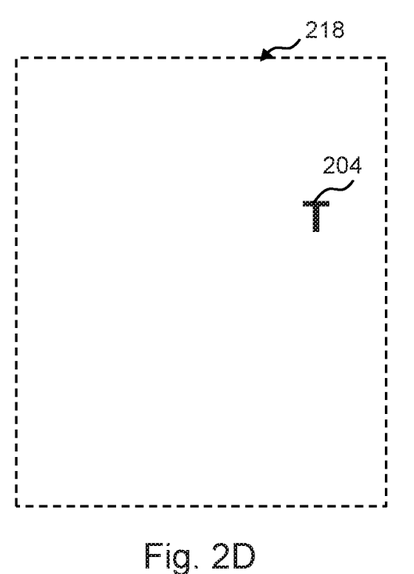
Figure 2E:
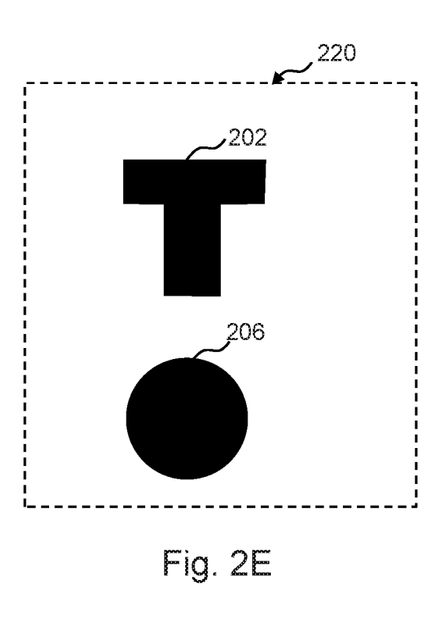

FIG. 2C shows the magenta print agent color plane 216, again with solid black indicating the intended placement of print agent. In this case, the large red T shape 202 and the frame 208 are to receive magenta print agent, so these shapes are represented in the magenta print agent color plane 216. FIGS. 2D and 2E show, respectively, the cyan and yellow print agent color planes 218, 220. The cyan print agent color plane 218 includes the small cyan T shape 204 and the yellow print agent color plane 220 includes the large T shape 202 and the yellow circle 206.

Figure 2F:
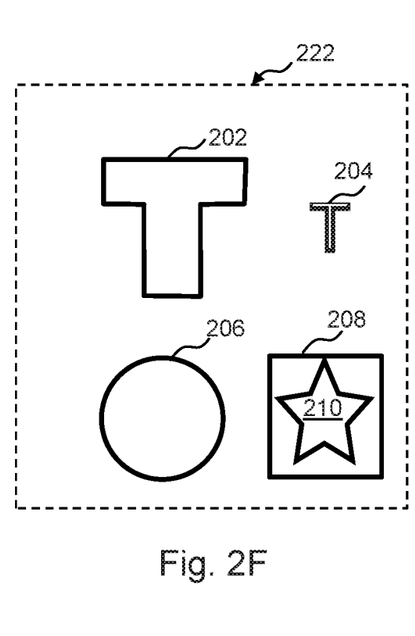
FIG. 2F is an example of a map of coincident edges in the image of FIG. 2A.

FIG. 2F shows the coincident edges of an area to be printed with both the background print agent and at least one image print agent, and is therefore referred to as a coincident edge map 222 herein. These may be identified, for example, by performing an 'edge detect' operation on the white image plane. This may for example make use of an edge detect kernel such as a Sobel filter or the like. The resulting 'edge map' may then provide an input to a logical 'AND' operation with each of the other color planes 216, 218, 220. A composite of such AND operations may be produced to provide the coincident edge map 222. Where the background color plane is defined to underlie regions of an image color plane directly, this will identify coincident edge regions which are edges in both the background and the image print agent color planes. In other examples, an edge map of the color planes (or a composite edge map) may be produced and used in an AND operation with the edge detect map of the white image plane to detect edges in the color planes which overlie one another. In this case, it will be seen that the border 212 cannot be seen. As this has no overlying image print agent color, it is not identified in the AND operation. Therefore, no modification of the border 212 would be carried out in block 106 as set out above. However, the edges of the shapes are shown, including the edges of the 'knock out' or negative feature of the star shape 210. These edges are the coincident edges and at least one of the initial background print agent color plane and an initial image print agent color plane in the vicinity of the identified coincident edge region is to be modified to determine a modified color plane.

Figure 3:
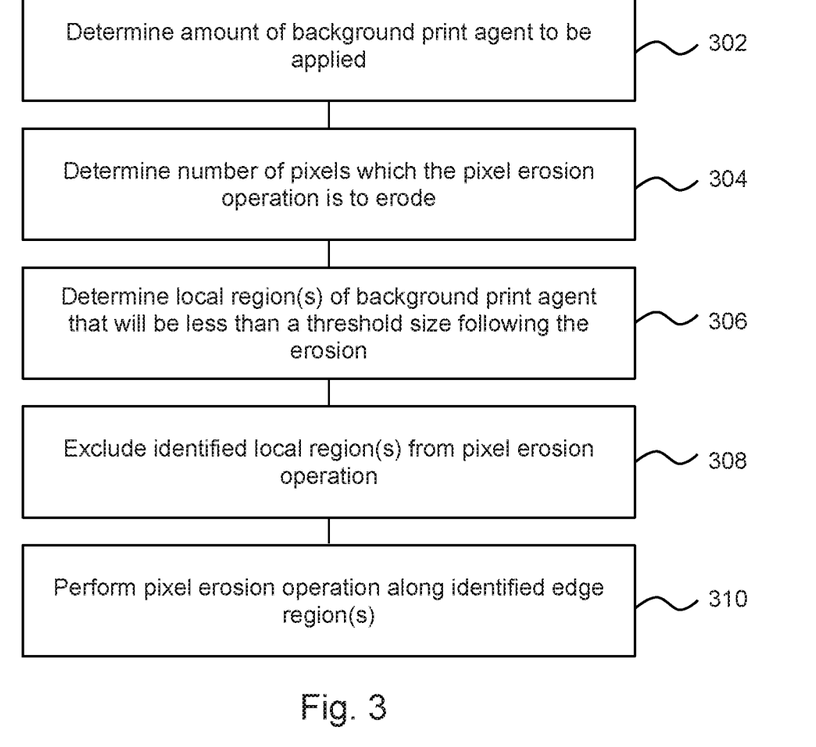
FIG. 3 is a flow chart showing an example of a method of modifying a color plane.

FIG. 3 shows an example of a method of carrying out block 106 above, based on coincident edges of areas to be printed with both the background print agent and the image print agent which had been identified according to block 104. In this example, pixels are to be selectively eroded in a background print agent color plane. The method comprises, in block 302, determining an amount of background print agent to be applied in an area to be printed with both the background print agent and the image print agent. In some examples, the amount of print agent to be applied may be consistent over the entire image to be formed. For example, this may comprise determining a coverage level, which may for example be a level between 0 and a maximum coverage for a given print apparatus. For example, in one print mode, color planes may be printed at around half of the maximum coverage and white planes may be printed at around the maximum coverage. In other examples, both may be printed at around half the maximum coverage, or less than the maximum coverage. For example, darker substrates may receive more background print agent than lighter substrates to mask the appearance of the substrate through an overprinted image.

Block 304 comprises determining a number of pixels which the pixel erosion operation is to erode based on the amount of background print agent to be applied in the area to be printed with both the background print agent and the image print agent. For example, the number of pixels to erode may be higher when the coverage level is higher. This may be because a higher coverage level may be associated with a greater amount, or greater risk of 'bleed'. Therefore, for a relatively low amount of background print agent, the number of pixels may be relatively small and for a relatively high amount of background print agent, the number of pixels may be larger. For example, the number of pixels may vary between 0 and 20. In some examples, the number of pixels eroded may vary between 3 and 8, based on coverage level, for example comprising 4 pixels. In some examples, the background coverage levels may vary over an image (for example, an area to be overprinted with a darker color may receive less background print agent as the image print agent(s) will provide more of a masking effect), and therefore this number may vary over the image.

In this example, the number of pixels may be determined automatically, for example by a processor or the like, for example based on a lookup table or a scheme which associates a coverage level with a number of pixels. However, in other examples, user input may be provided to set a number of pixels or to override an automatically selected number of pixels. In some examples, a number of pixels to erode may be determined based on, for example, the print apparatus and/or print agent used, as the amount of bleed which is anticipated may depend on such factors. In some examples, the number of pixels may be predetermined.

Block 306 comprises determining if there is a local region of background print agent that will be less than a threshold size following the erosion. In some examples, the threshold size may be one pixel. In other words, block 306 may identify those regions which would be eroded entirely by the erosion operation. In some examples, this operation may be performed at a pixel level, and may comprise checking for the presence of pixel neighbors after erosion using a kernel of programmable size. In another example, a pixel erosion may be carried out followed by a dilation, in which neighboring pixels are added to present pixels along the edge. If a feature is eroded entirely, it will not be restored by a dilation operation as there will be no present pixels remaining, and therefore comparing an original color plane to an 'eroded then dilated' color plane will identify those local regions which are entirely eroded by the erosion operation.

Block 308 comprises excluding any local region identified in block 306 from the pixel erosion operation. For example, it may be the case that an erosion of 4 pixels along a coincident edge is to be performed. To consider a relatively fine feature, such as a letter in text, the lines of the letter may be relatively thin, and may be less than 8 pixels thick. If for example, the small T shape 204 described in FIGS. 2A-F comprises lines which are less than 8 pixels thick, performing the erosion operation may result in the intended placement of white ink to form the T shape 204 being removed entirely from the background print agent color plane. This may result in the T shape 204 being printed in cyan alone, which may have an adverse impact on image quality. For example, the cyan may be less vivid than in other areas of the image. In some examples, this may make text less easy to read, or could result in color variations which detract from image quality. In some examples, the colored portion may not be visible, for example if it is against a dark substrate, without a background color plane.

Therefore, in this example, the small T shape 204 would be preserved in the white color plane by the exclusion operation of block 308.

Block 310 comprises performing a pixel erosion operation along the identified edge region in the background print agent color plane, excluding any region identified in block 308. This may for example comprise deleting n pixels, counting from a normal to a boundary, when n is the number identified in block 304, but excluding any of the pixels by the exclusion operation of block 308.

Figure 4:
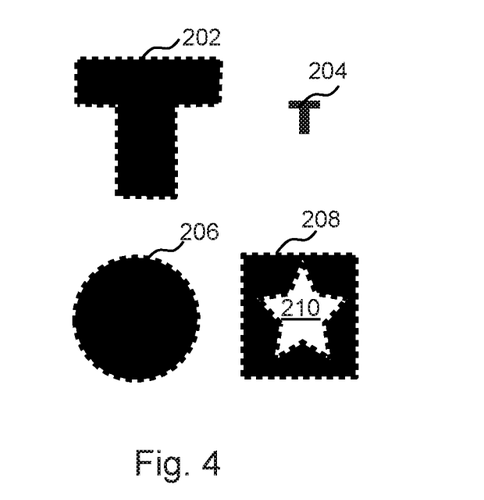
FIG. 4 is an example of a pixel erosion map.

FIG. 4 shows an example of the white background print agent color plane 214, with pixels to be eroded shown with dotted lines. The large T-shape 202 and the circle 206 are made smaller, and the frame 208 is eroded in both its external and internal dimensions (or put another way, the unprinted star shape 210 is defined to be larger. It may be noted that these erosions are to compensate for bleed in the background print agent. Therefore, it is expected that print agent applied to the indicated regions could spread beyond those locations.

It may be the case that a white 'halo' is apparent around the small T-shape once printed in cyan. However, this may be less detrimental to image quality than the alternative: printing cyan (or more generally, the image portion) without a background. In addition, as the area is relatively small, it may, in some examples, be less prone to 'bleeding' than more extensive regions of background print agent.

Figure 5:
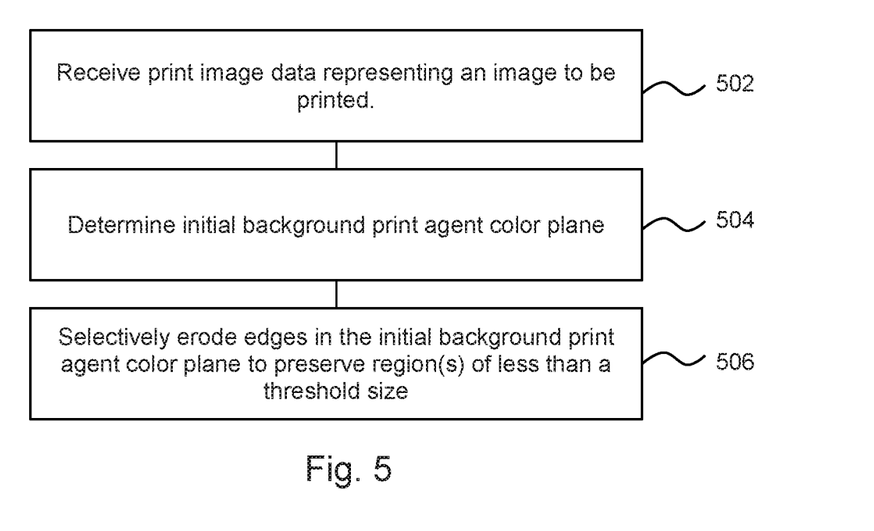
FIGS. 5, 6 and 7 are flow charts showing examples of methods of modifying a color plane.
Figure 6:
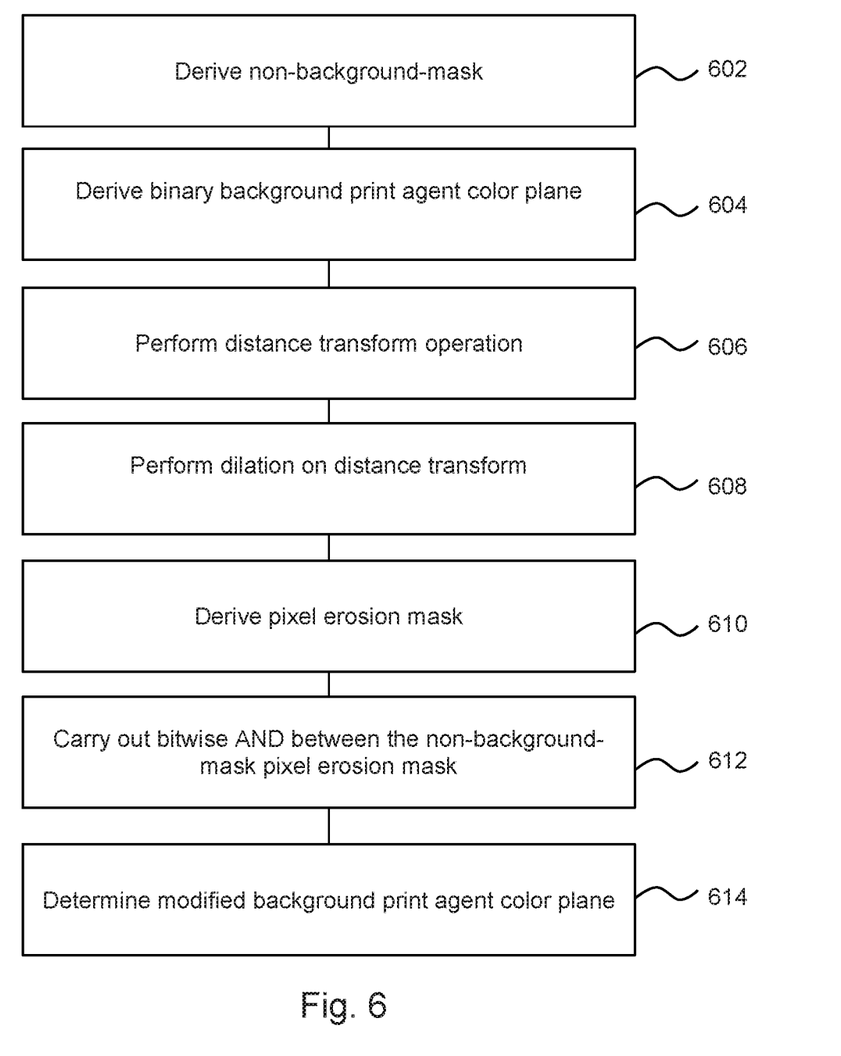

While a specific edge detection process may be carried out in some examples, this may not be the case in all examples of selective background print agent color plane erosion, as is described in greater detail in relation to the examples of FIGS. 5 and 6.

Another example method of carrying out pixel erosion of the background print agent color plane, which may be a computer implemented method, i.e. a method carried out by at least one processor, is shown in FIG. 5.

Block 502 comprises receiving, at a processor, print image data representing an image to be printed. This may for example be as described above in relation to block 102.

Block 504 comprises determining, by a processor and from the print image data, an initial background print agent color plane specifying an intended placement of background print agent. As noted above, in some examples, such background print agent color planes may be provided as the print image data, in other examples, a color plane may be derived therefrom.

Block 506 comprises selectively eroding, by a processor, edges in the initial background print agent color plane to determine a modified background print agent color plane. In this example, selectively eroding the edges comprises determining at least one local region of background print agent that will be less than a threshold size following the erosion and excluding any identified local region from the pixel erosion operation. In other words, erosion is carried out to preserve regions which are less than a threshold size. In some examples, the selective erosion may maintain at least one pixel, such that continuousness of printing areas within the background print agent color plane is preserved.

One example of selective erosion as described in block 506 is now described in FIG. 6. In this example a 'skeleton' of the shapes and features to be printed in the background color plane is to be preserved.

In this example (although this may be omitted in other examples) an erosion is to be applied to a pixel when a pixel is present in at least one of a background print agent color plane and at least one image print agent color plane, and not otherwise. Therefore, the method comprises block 602. In block 602, a non-background-mask is derived by applying a pixel-wise logical OR to all of the non-background planes and 'binarizing' this mask.

In this example, a binary version of the background print agent color plane is determined (where a pixel has a value of 1 if the original pixel value is different from 0, and 0 otherwise) in block 604. In some examples, the initial background print agent color plane may be binary, in which case block 604 is omitted. In block 606, a distance transform operation is carried out to derive the distance of each pixel from a boundary. Using such a distance transform operation (which results in an output referred to as a distance transform), pixels may be assigned values based on their distance from a boundary. Thus, in one example, a pixel at a boundary may be given a value of 0 whereas a pixel which is four pixels away from the boundary along a normal may be given a value of 4 (although there are other ways in which values may be assigned in such a transform operation, and the values assigned need not be integers). For example, distance may be defined in a defined space (e.g. Euclidian or Huber space).

In block 608, a morphological dilation is applied to the distance transform, meaning that each pixel in a defined neighborhood (or more formally, to which a structural element, or kernel, is applied) takes the highest pixel value in that neighborhood). The size of the neighborhood in this example is based on the number of pixels which are intended to remain following an erosion, and in this example is defined as twice the number of pixels to be preserved, plus 1. Therefore, if at least one background pixel is to be maintained, this size will be 3 pixels (i.e. a 3 by 3 pixel square). This operation provides a 'dilated distance transform'. A pixel erosion mask is then determined in block 610, which exists (e.g. has a pixel value=1) if:

(i) a pixel value in the distance transform (DT) is less than or equal to the number of pixels to be dilated; and
(ii) the difference between pixel values in the distance transform and the dilated distance transform (DDT) is greater than the number of pixels to be retained minus 1. The number of pixels to be retained represents the width of the skeleton to be preserved, i.e. in this case a skeleton having a width of at least one pixel is retained (the skeleton may be wider in other areas following erosion). Unless both conditions are met, the mask does not exist for that pixel (e.g. the mask has a pixel value=0 for that pixel)

These conditions can be stated as:
(i) DT≤number of pixels to be eroded, AND
(ii) DT−DDT>number of pixels to be retained−1

To consider an example, in a particular case, it may be intended that 4 pixels are to be eroded, except if less than one pixel remains in a neighborhood. In such an example, a pixel which is '4 pixels' inside an image feature may have a value in the distance transform of 4. Therefore, this satisfies the condition (i).

If this pixel is a central pixel within the feature (a pixel which lies on a medial axis, i.e. is equidistant from two edges), it may have the highest value in its neighborhood, so its value in the dilated distance transform will also be 4. Applying condition (ii), 4-4 is not greater than the number of pixels to keep, which in this example is one pixel, less one pixel, i.e. zero is not greater than zero, so the second condition is not satisfied.

If instead the pixel is not a central pixel, the neighborhood will include at least one higher value, e.g. a value of 5 or 6 from the two other pixels in the neighborhood. In such an example, the condition (ii) is satisfied. As both conditions (i) and (ii) are satisfied, the pixel is a candidate for erosion and is given a value of 1 in the pixel erosion mask.

As noted above, in this example, a pixel of the background color plane is a candidate for erosion if it coincides with a pixel of at least one image color plane, and not otherwise. Therefore, in this example, the method comprises block 612, carrying out a bitwise AND operation between the non-background-mask derived in block 602 and the pixel erosion mask. This has the effect of excluding any pixel which is not found in any initial image print agent color plane from the pixel erosion mask.

In block 614, the modified background print agent color plane is determined as a pixel-wise OR operation between the binary version of the original background print agent color plane and the modified pixel erosion mask derived by the operation of block 612.

In effect, this preserves a 'skeleton' of the shapes within the background color plane, wherein the skeleton has a thickness equal to the number of pixels to be preserved. In other words, at least continuousness of printing areas within the background print agent color plane is preserved, and in some example a minimum region of coverage may be preserved. This also has the effect of preserving small areas in the background print agent color plane.

It may be noted that, by including blocks 602 and 612, a pixel in the background print agent color plane may be eroded (i.e. is a candidate for erosion) if the background plane coincides with a pixel of at least one image print agent color plane, but not otherwise. However, if these blocks are omitted, as they may be in some examples, then a pixel in the background print agent color plane may be eroded regardless of the content of the image print agent color plane.

In other examples, block 506 may be carried out for example using the techniques described in relation to blocks 306-310 above (and the techniques of blocks 302 and 304 in some examples).

Figure 7:
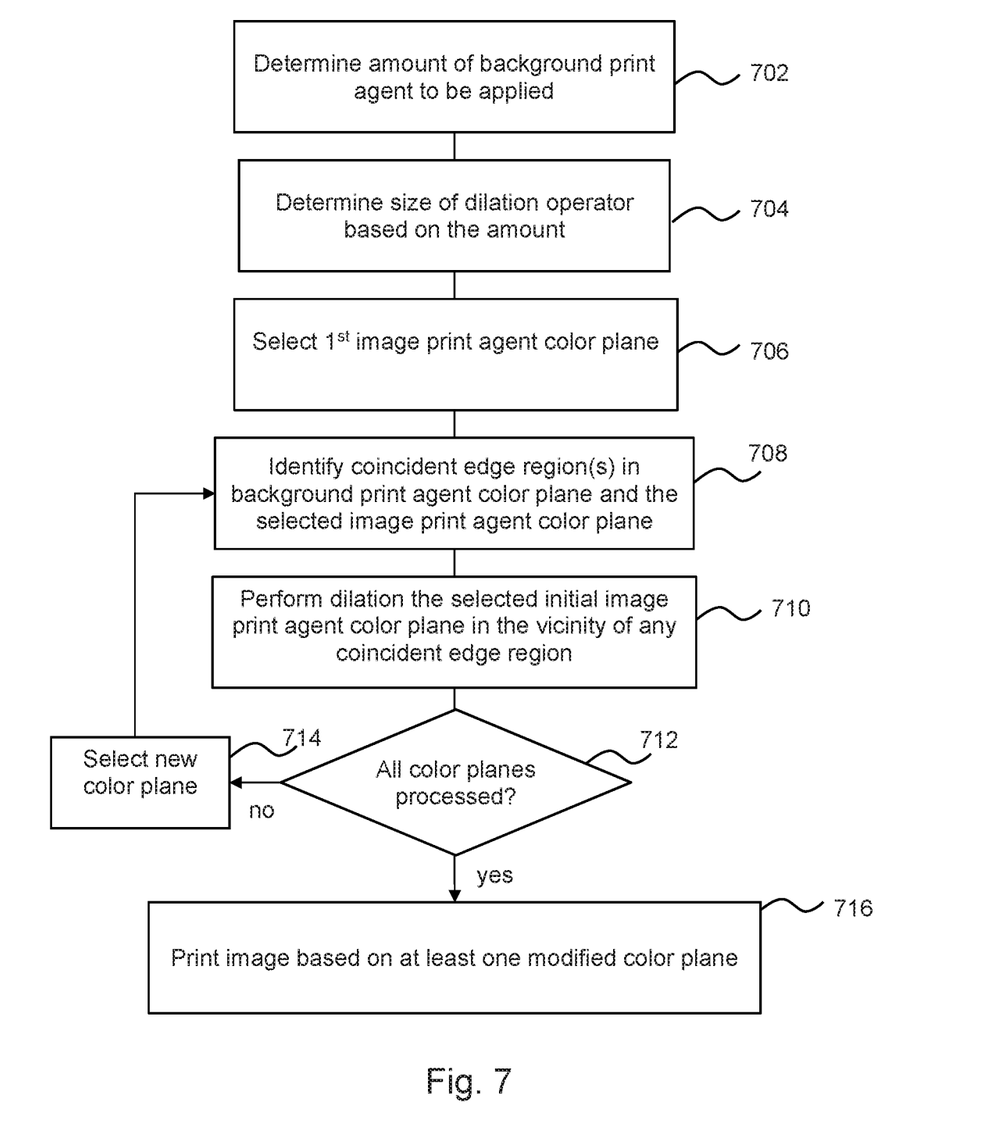

FIG. 7 shows, in blocks 702-714, another example of a method of carrying out block 106. In this example, rather than applying a modification to the initial background print agent color plane as discussed in FIGS. 3-6, the modification is a dilation operation which is applied to the initial image print agent color plane in the vicinity of any identified coincident edge region.

Block 702 comprises determining an amount of background print agent to be applied in an area to be printed with both the background print agent and the image print agent. This determination may be carried out as described in relation to block 302 above. Block 704 comprises determining the size of a dilation operator based on the amount of background print agent to be applied in the area to be printed with both the background print agent and the image print agent. As noted above, as bleeding can increase with coverage, the size of the dilation operator may be increased with coverage to ensure that background bleed is overprinted with an image print agent. In some examples, the size of the operator may be specified (or overwritten) by a user. In other examples, the size may be predetermined. In some examples, the size of the operator may take into account the print apparatus and/or print agent(s) to be used in printing the image, as the amount of bleed which is anticipated may depend on such factors.

The dilation operator size may for example be selected as between 1 and 20 pixels, or between 4 and 8 pixels. In some examples, the operator is a two dimensional operator, and both dimensions may be selected (or the operator may be square).

Block 706 comprises selecting a first image print agent color plane and, in block 708, identifying coincident edge region(s) in the initial background print agent color plane and the selected initial image print agent color plane. For example, this may be carried out as described in relation to block 104 and/or in relation to FIG. 2F above.

Block 710 comprises dilating the selected initial image print agent color plane in the vicinity of any identified coincident edge region therein. This may in some examples be referred to as a 'blooming' or dilation operation, and may be carried out using a 'max filter' (which, as described above, replaces every value by the maximum value in its neighborhood, which is specified as an operator size), or by replicating the value of a central pixel to the neighboring pixels. In other examples, a mean or median pixel value may be used in the dilation operation. The operator may have the size determined in block 704, or may have a different size.

The method then proceeds in block 712 in which it is determined if all image print agent color planes have been processed. If not, the method proceeds with the selection of another image print agent color plane in block 714, and the method loops back to block 708. Once all the image print agent color planes have been processed, this example of the method of block 106 is complete. In this example, the method then proceeds to block 716, which comprises printing the image based on at least one modified color plane.

The methods described in relation to FIGS. 3-6 are carried out on just one color plane, and therefore may be less computationally demanding than the method of FIG. 7. However, the method of FIG. 7 may result in fewer artefacts, and may result in few issues with poorly defined edges, for example associated with aliasing.

Figure 8:
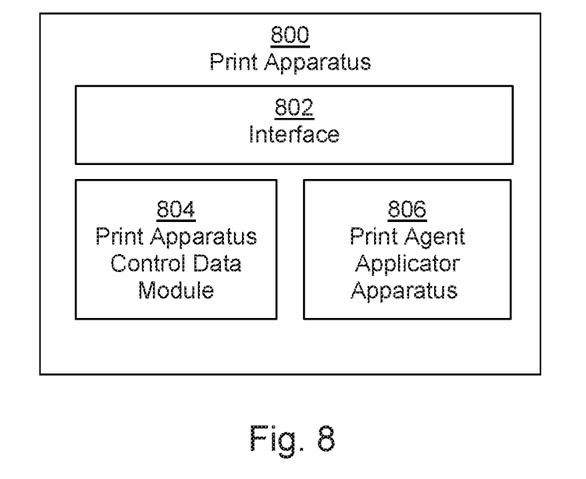
FIG. 8 is a simplified schematic of an example print apparatus.

FIG. 8 is an example of a print apparatus 800 comprising an interface 802, a print apparatus control data module 804 and a print agent applicator apparatus 806.

The interface 802, in use of the print apparatus 800, receives image data indicative of an image to be printed on a substrate. The image data may be print image data as discussed in relation to block 102 and block 502. The interface 802 may receive the image data from a local memory, or over a network or the like. The print apparatus control data module 804 determines print instructions for printing the image.

In one example, the print apparatus control data module 804 may determine the print instructions by selectively modifying a print agent color plane by (i) selectively modifying at least one of a background print agent color plane and an image print agent color plane in the vicinity of a coincident edge region (which may be an edge region in at least the background print agent color plane, and which may be an edge of overlapping print agent application areas in both color planes) and/or (ii) selectively eroding edges in the initial background print agent color plane to determine a modified background print agent color plane, wherein the erosion is selective is that at least one local region of background print agent that would be less than a threshold size following the erosion is excluded from the erosion operation. Excluding local regions of background print agent that will be less than a threshold size following the erosion may preserve continuousness, a minimum background coverage and/or a 'skeleton' of print areas within the background print agent color plane.

The color planes are derived from the image data. In some examples, the image data may comprise the color planes, which are extracted therefrom to derive the color planes. In other examples, a color plane, or color planes, may be determined by processing apparatus of the print apparatus 800. For example, RGB image data may be converted to CMYK color data, and/or a background print agent color plane may be derived based on system specifications, an indication of a substrate for printing, user input or the like.

The print apparatus control data module 804 may for example carry out any, or any combination, of the blocks of FIGS. 1, 3, 5, 6 or blocks 702-714 of FIG. 7.

In some examples the print apparatus control data module 804 selectively modifies the background print agent color plane by performing an erosion operation in the vicinity of the coincident edge region, wherein the erosion operation is to be carried out selectively in regions in which, following erosion, continuousness of printing areas within the print agent color plane are preserved. In some examples, a topological 'skeleton' (or medial axis) of printing areas, which may be a skeleton of specified thickness, may be preserved. The topological skeleton may be a morphological skeleton.

In some examples, the print apparatus control data module 804 selectively modifies the image print agent color plane by performing a pixel dilation operation in the vicinity of the coincident edge region.

In some examples, a combination of these techniques may be applied, for example different techniques being applied to a different image area (which may in some examples be determined automatically, or may be user determined, or the like).

The print agent applicator apparatus 806, in use of the print apparatus 800, applies print agent to the substrate according to the print instructions. For example, the print agent applicator apparatus 806 may comprise print heads (for example, inkjet or bubble jet print heads), printing drums or plates, or the like. The print agent applicator apparatus 806 may for example comprise electrophotographic printing apparatus (including liquid electrophotographic printing apparatus). In some examples, the print agent applicator apparatus 806 may be a scanning print agent applicator apparatus 806 (i.e. a print head makes printing passes relative to a substrate). In other examples, the print agent applicator apparatus 806 may be a nonscanning print agent applicator apparatus 806, for example comprising a page wide array of nozzles which apply print agent to a substrate.

Figure 9:
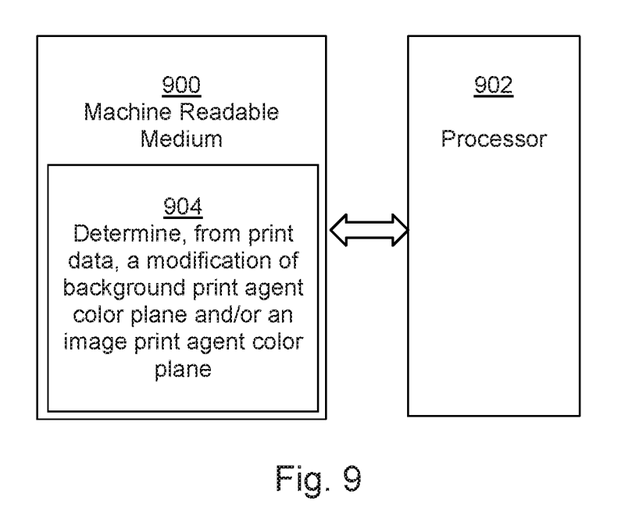
FIG. 9 is a schematic example of a machine readable medium associated with a processor.

FIG. 9 shows a non-transitory, tangible machine readable medium 900 in association with a processor 902. The machine readable medium 900 stores instructions 904 in a non-transitory manner. The instructions 904, when executed by the processor 902, cause the processor 902 carry out processes. The instructions 904 comprise instructions to cause the processor 902 to determine, from print data indicative of an image to be printed on a substrate, a modification of at least one of a background print agent color plane and an image print agent color plane. The print data may comprise image data and/or the color planes.

In one example, the modification is to be selectively applied in the vicinity of an coincident edge region (which may be an edge of an area in at least the background print agent plane where the area is also present in an image print agent color plane, and may be a collocated edge of overlapping print agent application areas in both color planes) and the modification comprises at least one of (i) an erosion operation in the background print agent color plane in the vicinity of the coincident edge region; and (ii) a dilation operation in an image print agent color plane in the vicinity of a coincident edge region.

In another example, the modification is to erode edges in the initial background print agent color to determine a modified background print agent color plane, wherein at least one (and in some examples, any) local region of background print agent that will be less than a threshold size following the erosion is excluded from the pixel erosion operation. In some examples, this may preserve a skeleton of features to be printed in the background print agent color plane. In some examples, any pixel which is not coincident with at least one image colors plane pixel may be excluded from the erosion operation.

In some examples, the machine readable medium 900 stores instructions 904 to carry out any, or any combination, of the blocks of FIGS. 1, 3, 5, 6 or blocks 702-714 of FIG. 7.

Examples in the present disclosure can be provided as methods, systems or machine readable instructions, such as any combination of software, hardware, firmware or the like. Such machine readable instructions may be included on a computer readable storage medium (including but not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that blocks in the flow charts and/or block diagrams, as well as combinations of the blocks in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams (for example, the processor 902). In particular, a processor or processing apparatus may execute the machine readable instructions. Thus functional modules of the apparatus and devices (for example, the print apparatus control data module 804) may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage (for example, the machine readable medium 900) that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method comprising:
   receiving, at a processor, print image data representing an image to be printed,
   identifying, by a processor and from the print image data, a coincident edge region in an initial background print agent color plane specifying an intended placement of background print agent and an initial image print agent color plane specifying an intended placement of an image print agent, wherein the coincident edge region is an edge in an area to be printed with both the background print agent and the image print agent; and
   selectively modifying, by a processor, at least one of the initial background print agent color plane and the initial image print agent color plane in a vicinity of the identified coincident edge region to determine a modified color plane.

2. A method according to claim 1 wherein the selective modification is to compensate for bleed in a background print agent.

3. A method according to claim 1 in which selectively modifying at least one of the initial background print agent color plane and the initial image print agent color plane in the vicinity of the coincident edge region comprises:
 performing a pixel erosion operation along the identified coincident edge region in the initial background print agent color plane.

4. A method according to claim 3 further comprising, prior to eroding pixels from the identified coincident edge region in the initial background print agent color plane,
 determining, by a processor, whether there is a local region of background print agent that will be less than a threshold size following the erosion and, if at least one such region is identified, excluding the identified local region from the pixel erosion operation.

5. A method according to claim 4 in which the threshold size is one pixel.

6. A method according to claim 3 in which selectively modifying at least one of the initial background print agent color plane and the initial image print agent color plane in the vicinity of the coincident edge region comprises:
 determining a distance transform of the initial background print agent color plane;
 determining a morphological dilation of the distance transform using a structural element having a size based on a number of pixels to be preserved following an erosion operation;
 determining a pixel erosion mask which exists where (i) a pixel value in the distance transform is less than or equal to the number of pixels to be dilated; and (ii) a difference between a pixel value in the distance transform and the dilated distance transform is greater than the number of pixels to be retained minus one; and
 performing a pixel erosion operation by carrying out a pixel-wise OR operation between the initial background print agent color plane and the pixel erosion mask.

7. A method according to claim 3 in which the pixel erosion operation is to erode a number of pixels along the identified coincident edge region, and the method comprises:
 determining, by a processor, the number of pixels based on an amount of background print agent to be applied in the area to be printed with both the background print agent and the image print agent.

8. A method according to claim 1 in which selectively modifying at least one of the initial background print agent color plane and the initial image print agent color plane in the vicinity of the identified coincident edge region comprises:
 dilating the initial image print agent color plane in the vicinity of the coincident edge region.

9. A method according to claim 8 comprising identifying coincident edge regions in the initial background print agent color plane and each of a plurality of initial image print agent color planes, and dilating each initial image print agent color plane in a vicinity of any coincident edge region therein.

10. A method according to claim 8 in which the dilation comprises a pixel dilation operation based on an operator having a size, and the method comprises:
 determining the size of the operator based on an amount of background print agent to be applied in the area to be printed with both the background print agent and the image print agent.

11. A method according to claim 1 further comprising printing the image based on at least one modified color plane.

12. A print apparatus comprising:
 an interface to receive image data indicative of an image to be printed on a substrate;
 a print apparatus control data module to determine print instructions for printing the image, wherein determining the print instructions comprises modifying a print agent color plane derived from the image data by at least one of:
 (i) selectively modifying at least one of a background print agent color plane and an image print agent color plane in the vicinity of a coincident edge region wherein the coincident edge region is an edge in an area to be printed with both the background print agent and the image print agent; and
 (ii) selectively eroding edges in an initial background print agent color plane to determine a modified background print agent color plane such that a local region of background print agent that will be less than a threshold size following the erosion is excluded from the erosion; and
 a print agent applicator apparatus to apply print agent to the substrate according to the print instructions.

13. A print apparatus according to claim 12, wherein the print apparatus control data module is to selectively modify the background print agent color plane by performing an erosion operation in the vicinity of the coincident edge regions, wherein the erosion operation is to be carried out selectively in regions in which, following erosion, continuousness of at least one printing areas within the background print agent color plane is preserved.

14. A print apparatus according to claim 12, wherein the print apparatus control data module is to selectively modify the image print agent color plane by performing a dilation operation in the vicinity of the coincident edge regions.

15. A method comprising:
 receiving, at a processor, print image data representing an image to be printed,
 determining, by a processor and from the print image data, an initial background print agent color plane specifying an intended placement of background print agent; and
 selectively eroding, by a processor, edges in the initial background print agent color plane to determine a modified background print agent color plane, wherein selectively eroding the edges comprises determining whether there is a local region of background print agent that will be less than a threshold size following the erosion and, if at least one such region is identified, excluding the identified local region from the pixel erosion operation.

16. A method according to claim 15 in which selectively eroding the edges is carried out such that continuousness of printing areas within the background print agent color plane is preserved.

17. A method according to claim 15 in which selectively eroding the edges comprises performing a pixel erosion operation which preserves a topological skeleton of printing areas within the background print agent color plane.

18. A method according to claim 17 further comprising selecting a width of the topological skeleton.

19. A method according to claim 15 in which selectively eroding the initial background print agent color plane comprises:

determining a distance transform of the initial background print agent color plane;

determining a morphological dilation of the distance transform using a structural element having a size based on a number of pixels to be preserved following an erosion operation;

determining a pixel erosion mask which exists where (i) a pixel value in the distance transform is less than or equal to the number of pixels to be dilated; and (ii) a difference between a pixel value in the distance transform and the dilated distance transform is greater than the number of pixels to be retained minus one; and performing a pixel erosion operation by carrying out a pixel-wise OR operation between the initial background print agent color plane and the pixel erosion mask.

20. A method according to claim 19 further comprising:

determining, by a processor, and from the print image data, at least one initial image print agent color plane specifying an intended placement of an image print agent; and prior to performing the pixel erosion operation, excluding from the pixel erosion mask any pixel which is not found in any initial image print agent color plane.

\* \* \* \* \*